(12) United States Patent
Liao et al.

(10) Patent No.: US 6,909,931 B2
(45) Date of Patent: Jun. 21, 2005

(54) METHOD AND SYSTEM FOR ESTIMATING MICROELECTRONIC FABRICATION PRODUCT YIELD

(75) Inventors: Yun-Wei Liao, Hsin-Chu (TW); Regina Ka, Hsinchu (TW); Mei-Ling Chu, Hsinchu (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 558 days.

(21) Appl. No.: 10/162,275

(22) Filed: Jun. 4, 2002

(65) Prior Publication Data

US 2003/0225475 A1 Dec. 4, 2003

(51) Int. Cl.[7] ............................................. G06F 19/00
(52) U.S. Cl. ......................... 700/121; 702/81; 700/108
(58) Field of Search ............................... 700/121, 108, 700/109, 110; 702/81; 438/14; 716/4

(56) References Cited

U.S. PATENT DOCUMENTS

| | | | |
|---|---|---|---|
| 5,754,432 A | | 5/1998 | Komatsuzaki et al. |
| 5,773,315 A | * | 6/1998 | Jarvis ........................... 438/14 |
| 5,946,214 A | | 8/1999 | Heavlin et al. |
| 6,368,884 B1 | * | 4/2002 | Goodwin et al. ............. 438/14 |

FOREIGN PATENT DOCUMENTS

EP           0 872 883          * 10/1998

* cited by examiner

Primary Examiner—Leo Picard
Assistant Examiner—Steven R. Garland
(74) Attorney, Agent, or Firm—Tung & Associates

(57) ABSTRACT

Within a method for estimating a microelectronic fabrication product yield and a system for estimating the microelectronic fabrication product yield there is employed a specific mathematic algorithm for estimating yield of a new microelectronic fabrication product within at least one microelectronic fabrication facility. The specific algorithm is solved incident to parametric data correlation with existing production data within the at least one microelectronic fabrication facility.

14 Claims, 2 Drawing Sheets

METHOD AND SYSTEM FOR ESTIMATING MICROELECTRONIC FABRICATION PRODUCT YIELD

BACKGROUND OF THE INVENTION

1. Field of the Invention

The present invention relates generally to methods and systems for fabricating microelectronic fabrication products. More particularly, the present invention relates to methods and systems for estimating microelectronic fabrication product yield when fabricating microelectronic fabrication products.

2. Description of the Related Art

Microelectronic fabrications are formed from microelectronic substrates over which are formed patterned microelectronic conductor layers which are separated by microelectronic dielectric layers.

Desirable in the art of microelectronic fabrication for use when fabricating microelectronic fabrications are methods and systems for determining microelectronic fabrication product yield when fabricating microelectronic fabrication products. Methods and systems for determining microelectronic fabrication product yield when fabricating microelectronic fabrication products are desirable in the art of microelectronic fabrication insofar as such methods and systems in turn provide useful information which may be employed for: (1) projecting microelectronic fabrication substrate starts needed to fill a microelectronic fabrication product order; (2) accurately quoting the microelectronic fabrication product order; and (3) accurately forecasting a microelectronic fabrication facility utilization rate when fabricating a microelectronic fabrication product.

While methods and systems for determining microelectronic fabrication product yield when fabricating microelectronic fabrication products are thus clearly desirable in the art of microelectronic fabrication and often essential in the art of microelectronic fabrication, methods and systems for determining microelectronic fabrication product yield when fabricating microelectronic fabrication products are nonetheless not entirely without problems in the art of microelectronic fabrication. In that regard, methods and systems for determining microelectronic fabrication product yield when fabricating microelectronic fabrication products are not often readily implemented in the art of microelectronic fabrication insofar as they are often dependent upon complex, cumbersome and intricate microelectronic fabrication product yield modeling equations.

It is thus desirable in the art of microelectronic fabrication to provide methods and systems for accurately and efficiently estimating microelectronic fabrication product yields when fabricating microelectronic fabrication products.

It is towards the foregoing object that the present invention is directed.

Various methods and systems have been disclosed in the art of microelectronic fabrication for estimating microelectronic fabrication product yield when fabricating microelectronic fabrication products.

Included among the methods and systems, but not limited among the methods and systems, are methods and systems disclosed within: (1) Komatsuzaki et al., in U.S. Pat. No. 5,754,432 (a method and a system for estimating microelectronic fabrication product yield, where the method and the system are predicated upon presumed levels of ambient particles deposited upon microelectronic fabrication substrates when fabricating microelectronic fabrication products); and (2) Heavlin et al., in U.S. Pat. No. 5,946,214 (a computer implemented method for estimating microelectronic fabrication product yield when fabricating, in particular, microelectronic fabrication products having designed and fabricated therein redundancy circuits).

Desirable in the art of microelectronic fabrication are additional methods and systems which may be employed for efficiently estimating microelectronic fabrication product yields when fabricating microelectronic fabrication products.

It is towards the foregoing object that the present invention is directed.

SUMMARY OF THE INVENTION

A first object of the present invention is to provide a method and a system for estimating a microelectronic fabrication product yield when fabricating a microelectronic fabrication product.

A second object of the present invention is to provide a method and a system in accord with the first object of the present invention, wherein the microelectronic fabrication product yield is efficiently estimated.

A third object of the present invention is to provide a method and a system in accord with the first object of the present invention and the second object of the present invention, wherein the method and the system are readily commercially implemented.

In accord with the objects of the present invention, there is provided by the present invention a method and a system for estimating a microelectronic fabrication product yield when fabricating a microelectronic fabrication product.

To practice the method of the present invention, there is first provided a database containing therein historic production data for production of a series of existing microelectronic fabrication products fabricated within at least one microelectronic fabrication facility. Within the present invention, the historic production data comprises: (1) a series of historic die size options for the series of existing microelectronic fabrication products fabricated within the at least one microelectronic fabrication facility; (2) a series of arbitrarily determined historic mask complexity factors for a series of masks employed for fabricating the series of existing microelectronic fabrication products fabricated within the at least one microelectronic fabrication facility; and (3) a series of historic microelectronic fabrication product defect densities for the series of existing microelectronic fabrication products fabricated within the at least one microelectronic fabrication facility. There is then determined for a new microelectronic fabrication product to be fabricated within the at least one microelectronic fabrication facility: (1) a die size; (2) an N value which equals a summation of mask complexity factors for a series of masks employed for fabricating the new microelectronic fabrication product as determined through correlation with the series of historic mask complexity factors; and (3) a Do value which is a baseline microelectronic fabrication product defect density determined through correlation with the historic microelectronic fabrication product defect densities. Finally, there is then calculated an estimated yield for the new microelectronic fabrication product using the equation:

$$Est\ Yield = 1/(1+(Do*(resiX/25.4)*(resiY/25.4)))^N$$

where resiX and resiY are chip's reference size, i.e. X & Y dimension.

The method for estimating the microelectronic fabrication product yield in accord with the present invention contemplates a system for estimating the microelectronic fabrication product yield in accord with the present invention.

There is provided by the present invention a method and a system for estimating a microelectronic fabrication product yield when fabricating a microelectronic fabrication product, wherein the microelectronic fabrication product yield is efficiently estimated.

The method of the present invention and the system of the present invention realize the foregoing objects with respect to a new microelectronic fabrication product to be fabricated within at least one microelectronic fabrication facility, through use of a mathematic algorithm which operates in part through correlation with historic microelectronic fabrication production data for fabricating an existing series of microelectronic fabrication products fabricated within the at least one microelectronic fabrication facility.

The method of the present invention and the system of the present invention are readily commercially implemented.

As will be illustrated in greater detail within the context of the Description of the Preferred Embodiment, as set forth below, the present invention employs a mathematical algorithm and a computer system which are readily adapted to the art of microelectronic fabrication. Thus, the method of the present invention and the system of the present invention are readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

There is provided by the present invention a method and a system for estimating a microelectronic fabrication product yield when fabricating a microelectronic fabrication product, wherein the microelectronic fabrication product yield is efficiently estimated.

The method of the present invention and the system of the present invention realize the foregoing objects with respect to a new microelectronic fabrication product to be fabricated within at least one microelectronic fabrication facility, through use of a mathematic algorithm which operates in part through correlation with historic microelectronic fabrication production data for fabricating an existing series of microelectronic fabrication products fabricated within the at least one microelectronic fabrication facility.

While the preferred embodiment of the present invention provides particular value within the context of estimating semiconductor integrated circuit microelectronic fabrication product yield for a new semiconductor integrated circuit microelectronic fabrication product to be fabricated within at least one semiconductor integrated circuit microelectronic fabrication facility, the present invention is not so limited. Rather, the present invention may also be employed for estimating yield for various microelectronic fabrication products other than semiconductor integrated circuit microelectronic fabrication products, provided that the various microelectronic fabrication products other than semiconductor integrated circuit microelectronic fabrication products are fabricated while employing at least one masking level. Such other microelectronic fabrication products may include, but are not limited to, ceramic substrate microelectronic fabrication products.

Figure 1:
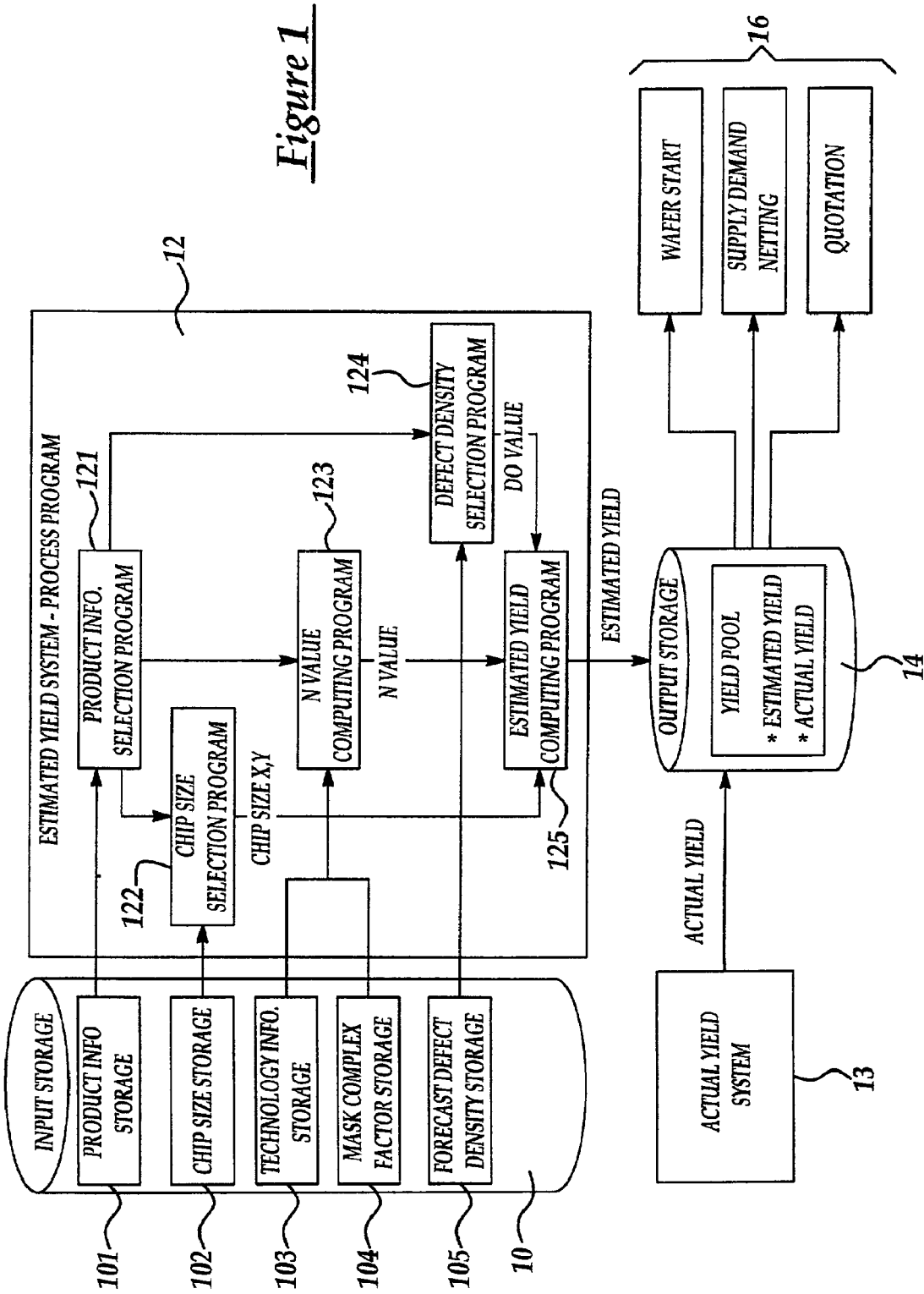
FIG. 1 shows a schematic flow diagram illustrating the method of the present invention.

Referring now to FIG. 1, there is shown a schematic flow diagram illustrating the method of the present invention.

As is shown in FIG. 1, in a first instance, and in accord with the block which corresponds with reference numeral 10, there is provided within the present invention historic production data for a series of microelectronic fabrications fabricated within at least one microelectronic fabrication facility. The historic production data is retained as inputted and stored historic production data within a database, typically and preferably a computer database. As is illustrated within FIG. 1 within the series of sub-blocks which correspond with reference numerals 101 to 105 within the block which corresponds with reference numeral 10, the inputted and stored historic production data comprises: (1) product information data 101; (2) chip size data 102; (3) technology information data 103; (4) mask complexity factor data 104; and (5) forecasted defect density data 105.

Within the preferred embodiment of the present invention, product information data 101 is intended to represent general historic data inputted and stored with respect to particular microelectronic fabrication product types fabricated within at least one microelectronic fabrication facility, including which of the at least one microelectronic fabrication facilities a particular product type has been fabricated.

Similarly, within the preferred embodiment of the present invention, chip size data 102 is intended to represent historic data inputted and stored with respect to chip sizes for various microelectronic fabrication products fabricated within the at least one microelectronic fabrication facility.

Yet similarly, technology information data 103 is intended as historic information inputted and stored with respect to technology type (which might include, for example and without limitation, semiconductor integrated circuit microelectronic fabrication logic technology type, semiconductor integrated circuit microelectronic fabrication memory technology type and semiconductor integrated circuit microelectronic fabrication embedded memory/logic technology type) fabricated within the at least one microelectronic fabrication facility.

Still yet similarly, mask complexity factor data 104 is intended as an arbitrarily determined photomask complexity factor in a range from about 0 to about 1 (where a higher value indicates a higher level of mask complexity) for each mask within a series of masks employed for fabricating the series of microelectronic fabrication products for which historic data is inputted and stored. Although other factors are not precluded when determining a mask complexity factor in accord with the present invention, a mask complexity factor may be determined employing mask design parameters, such as but not limited to minimum linewidth dimensions, mask layer areal coverage and mask layer design complexity.

Finally, the forecast defect density data 105 is intended as indicative of inputted and stored historic defect density by microelectronic fabrication facility and microelectronic product technology for the series of existing microelectronic fabrication products fabricated within the at least one microelectronic fabrication facility whose historic microelectronic fabrication product data is inputted and stored.

Referring again to FIG. 1 and in accord with the block of which corresponds with reference numeral 12, there is shown a series of sub-blocks 121 to 125 which delineate several operations in accord with calculating an estimated yield when fabricating a new microelectronic fabrication within a microelectronic fabrication facility in accord with a preferred embodiment of the present invention.

Shown in FIG. 1, and in accord with the sub-block which corresponds with reference numeral 121, there is first provided for product information selection when fabricating a new microelectronic fabrication product within a microelectronic fabrication facility in accord with the preferred embodiment of the present invention. In that regard, it is intended in accord with the block which corresponds with reference numeral 121 that a user may select from available product information for fabricating a new product within at least one microelectronic fabrication facility, or in an alternative, a user may define a totally new microelectronic fabrication product to be fabricated within the at least one microelectronic fabrication facility.

Shown also within FIG. 1, and in accord with the sub-block which corresponds with reference numeral 122, after execution of the product information selection portion of the program, there is next executed a chip size selection program. Similarly with the product information selection program, the chip size selection program also intends that a user may select from available chip sizes, or in the alternative, the user may select an entirely new chip size. As is illustrated in conjunction with the sub-block which corresponds with reference numeral 122, incident to a chip size selection, there is determined a pair of areal dimensional parameters X and Y for the selected chip size. Although not specifically illustrated within the sub-block which corresponds with reference numeral 122, there is also determined for the selected chip size values for resiX and resiY which are previously defined.

Shown also within FIG. 1, and in accord with the sub-block which corresponds with reference numeral 123, there is next computed an N value for the new microelectronic fabrication to be fabricated within the at least one microelectronic fabrication facility. Within the present invention, the N value is intended as a summation of mask complexity factors for the entire series of masks employed for fabricating the new microelectronic fabrication. Within the present invention, mask complexity factors for individual masks employed for fabricating the new microelectronic fabrication may be obtained from the mask complexity factor data stored in accord with the sub-block which corresponds with reference numeral 104 (if equivalent masks are employed for fabricating the new microelectronic fabrication product) or through correlation therewith (if an entirely new mask is needed for fabricating the microelectronic fabrication). As an example of calculation of an N value, if a new microelectronic fabrication employs six masks for its fabrication (whether previously existing or entirely new), and presuming that the six masks have a corresponding series of mask complexity factors of 0.1, 0.2, 0.5, 0.4, 0.5 and 0.1, a resulting N value would be 1.8.

Shown also within FIG. 1, and in accord with the sub-block which corresponds with reference numeral 124, there is determined a Do value incident to execution of a defect density selection program. Within the present invention, the defect density selection program is intended as both microelectronic fabrication product technology specific and microelectronic fabrication facility specific. It is similarly also intended as representative of a summation of defect densities typically accumulated within a specific microelectronic fabrication facility for a specific series of tool and operating environments within which is fabricated a specific microelectronic fabrication product technology type. Such defect density values are typically and preferably determined with respect to individual microelectronic fabrication substrates and reported in units of defects per substrate, as is otherwise generally conventional in the art of microelectronic fabrication.

Finally, shown also within FIG. 1, and in accord with the sub-block which corresponds with reference numeral 125, there is computed within the present invention an estimated yield for the new microelectronic fabrication product fabricated within the at least one microelectronic fabrication facility. The estimated yield is computed predicated upon chip size, N value and Do value. Specifics of the calculation of the estimated yield will follow below.

Referring again to FIG. 1, and in accord with the block which corresponds with reference numeral 14, the estimated yield as calculated in accord with the sub-block which corresponds with reference numeral 125 is entered into an output storage unit within a computer system in accord with the present invention, where it is pooled with actual yields observed for existing microelectronic fabrication products fabricated within the at least one microelectronic fabrication facility, in accord with the block which corresponds with reference numeral 13.

Referring finally again to FIG. 1, and in accord with the block which corresponds with reference numeral 16, either the estimated yield or the actual yield is employed for determining various operational parameters when fabricating the new microelectronic fabrication product, or an existing microelectronic fabrication product, within the at least one microelectronic fabrication facility. The enumerated operational parameters include wafer starts, supply demand netting customer "demand quantity" vs what fab could provide "supply quantity" and must use "yield" to meet and customer quotations, although other operational parameters may also be influenced incident to the method of the present invention.

Figure 2:
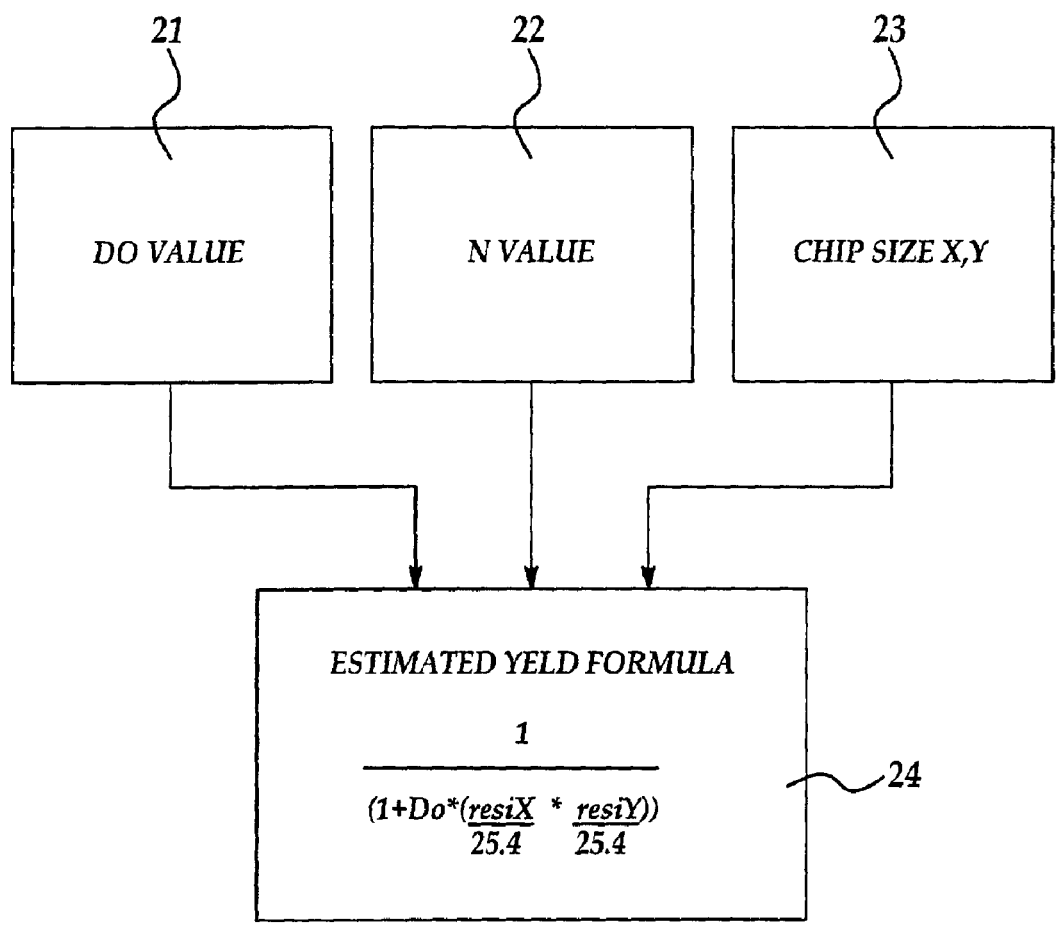
FIG. 2 shows a schematic flow diagram illustrating calculation of an estimated yield in accord with the method of the present invention.

Referring now to FIG. 2, there is shown a schematic flow diagram illustrating calculation of an estimated yield in accord with the present invention.

Shown in FIG. 2, and in accord with the blocks which correspond with reference numerals 21, 22 and 23, there is provided the Do value, the N value and the chip size as are determined in accord with the sub-blocks which correspond with reference numerals 124, 123 and 122 as illustrated within the schematic flow diagram of FIG. 1.

Referring again to FIG. 2, and in accord with the block which corresponds with reference numeral 24, there is calculated an estimated yield for the new microelectronic fabrication to be fabricated within a selected microelectronic fabrication facility. The estimated yield is calculated employing the equation:

$$Est\ \text{Yield} = 1/(1+(Do*(resiX/25.4)*(resiY/25.4)))^N$$

where resiX and resiY are as previously described above.

Upon calculating in accord with the equation within the block which corresponds with reference numeral 24 an estimated yield for an new microelectronic fabrication product in accord with the preferred embodiment of the present invention, there is efficiently estimated a microelectronic fabrication product yield in accord with the preferred embodiment of the present invention. The microelectronic fabrication product yield is efficiently estimated insofar as the estimated yield is predicated upon historic production data for fabricating existing microelectronic fabrication products within at least one microelectronic fabrication facility within which it is desired to fabrication the new microelectronic fabrication product.

As is understood by a person skilled in the art, while the preferred embodiment of the present invention discloses the present invention primarily as directed towards a method for estimating a microelectronic fabrication product yield for a new microelectronic fabrication product fabricated within a microelectronic fabrication facility, the present invention also contemplates a computer implemented system which effects the method of the present invention. Such a computer implemented system may employ data storage components (such as but not limited to magnetic data storage components and optical data storage components), and user interface components (such as but not limited to keyboards and video display screens) as are otherwise conventional in the art of microelectronic fabrication.

As is further understood by a person skilled in the art, the preferred embodiment of the present invention is illustrative of the present invention rather than limiting of the present invention. Revisions and modifications may be made to the method and the system in accord with the preferred embodiment of the present invention while still providing a method and a system in accord with the present invention, further in accord with the accompanying claims.

What is claimed is:

1. A method for estimating a microelectronic fabrication product yield comprising:
   providing a database containing therein historic production data for production of a series of existing microelectronic fabrication products fabricated within at least one microelectronic fabrication facility, the historic production data comprising:
      a series of historic die size options for the series of existing microelectronic fabrication products fabricated within the at least one microelectronic fabrication facility;
      a series of arbitrarily determined historic mask complexity factors for a series of masks employed for fabricating the series of existing microelectronic fabrication products within the at least one microelectronic fabrication facility; and
      a series of historic microelectronic fabrication product defect densities for the series of existing microelectronic fabrication products fabricated within the at least one microelectronic fabrication facility;
   determining for a new microelectronic fabrication product to be fabricated within the at least one microelectronic fabrication facility:
      a die size;
      an N value which equals a summation of mask complexity factors for a series of masks employed for fabricating the new microelectronic fabrication as determined through correlation with the series of historic mask complexity factors; and
      a Do value which is a baseline microelectronic fabrication product defect density determined through correlation with the series of historic microelectronic fabrication product defect densities; and
   calculating an estimated yield for the new microelectronic fabrication product using the equation:

$$\text{Est Yield} = 1/(1+(Do*(resiX/25.4)*(resiY/25.4)))^N$$

where resiX and resiY are chip's reference size X dimension and y dimension.

2. The method of claim 1 wherein the new microelectronic fabrication product is selected from the group consisting of semiconductor integrated circuit microelectronic fabrications and ceramic substrate microelectronic fabrications.

3. The method of claim 1 wherein the series of arbitrarily determined historic mask complexity factors span a range of from about 0 to about 1.

4. The method of claim 1 wherein the series of arbitrarily determined historic mask complexity factors is determined employing a mask fabrication parameter selected from the group consisting of mask layer minimum linewidth dimensions, mask layer areal coverage and mask layer design complexity.

5. A method for estimating a semiconductor microelectronic fabrication product yield comprising:
   providing a database containing therein historic production data for production of a series of existing semiconductor microelectronic fabrication products fabricated within at least one microelectronic fabrication facility, the historic production data comprising:
      a series of historic die size options for the series of existing semiconductor microelectronic fabrication products fabricated within the at least one semiconductor microelectronic fabrication facility;
      a series of arbitrarily determined historic mask complexity factors for a series of masks employed for fabricating the series of existing semiconductor microelectronic fabrication products within the at least one semiconductor microelectronic fabrication facility; and
      a series of historic semiconductor microelectronic fabrication product defect densities for the series of existing semiconductor microelectronic fabrication products fabricated within the at least one semiconductor microelectronic fabrication facility;
   determining for a new semiconductor microelectronic fabrication product to be fabricated within the at least one semiconductor microelectronic fabrication facility:
      a die size;
      an N value which equals a summation of mask complexity factors for a series of masks employed for fabricating the new semiconductor microelectronic fabrication as determined through correlation with the series of historic mask complexity factors; and
      a Do value which is a baseline semiconductor microelectronic fabrication product defect density determined through correlation with the series of historic semiconductor microelectronic fabrication product defect densities; and
   calculating an estimated yield for the new semiconductor microelectronic fabrication product using the equation:

$$\text{Est Yield} = 1/(1+(Do*(resiX/25.4)*(resiY/25.4)))^N$$

where resiX and resiY are chip's reference size X dimension and Y dimension.

6. The method of claim 5 wherein the series of arbitrarily determined historic mask complexity factors span a range of from about 0 to about 1.

7. The method of claim 5 wherein the series of arbitrarily determined historic mask complexity factors is determined employing a mask fabrication parameter selected from the group consisting of mask layer minimum linewidth dimensions, mask layer areal coverage and mask layer design complexity.

8. A system for estimating a microelectronic fabrication product yield comprising:

a database containing therein historic production data for production of a series of existing microelectronic fabrication products fabricated within at least one semiconductor microelectronic fabrication facility, the historic production data comprising:
  a series of historic die size options for the series of existing microelectronic fabrication products fabricated within the at least one microelectronic fabrication facility;
  a series of arbitrarily determined historic mask complexity factors for a series of masks employed for fabricating the series of existing microelectronic fabrication products within the at least one microelectronic fabrication facility; and
  a series of historic microelectronic fabrication product defect densities for the series of existing microelectronic fabrication products fabricated within the at least one microelectronic fabrication facility;
means for determining for a new microelectronic fabrication product to be fabricated within the at least one microelectronic fabrication facility:
  a die size;
  an N value which equals a summation of mask complexity factors for a series of masks employed for fabricating the new microelectronic fabrication as determined through correlation with the series of historic mask complexity factors; and
  a Do value which is a baseline microelectronic fabrication product defect density determined through correlation with the series of historic microelectronic fabrication product defect densities; and
means for calculating an estimated yield for the new microelectronic fabrication product using the equation:

$$Est\ Yield = 1/(1+(Do*(resiX/25.4)*(resiY/25.4)))^N$$

where resiX and resiY are chip's reference size X dimension and Y dimension.

9. The system of claim 8 wherein the new microelectronic fabrication product is selected from the group consisting of semiconductor integrated circuit microelectronic fabrications and ceramic substrate microelectronic fabrications.

10. The system of claim 8 wherein the series of arbitrarily determined historic mask complexity factors span a range of from about 0 to about 1.

11. The system of claim 8 wherein the series of arbitrarily determined historic mask complexity factors is determined employing a mask fabrication parameter selected from the group consisting of mask layer minimum linewidth dimensions, mask layer areal coverage and mask layer design complexity.

12. A system for estimating a semiconductor microelectronic fabrication product yield comprising:
a database containing therein historic production data for production of a series of existing semiconductor microelectronic fabrication products fabricated within at least one semiconductor microelectronic fabrication facility, the historic production data comprising:
  a series of historic die size options for the series of existing semiconductor microelectronic fabrication products fabricated within the at least one semiconductor microelectronic fabrication facility;
  a series of arbitrarily determined historic mask complexity factors for a series of masks employed for fabricating the series of existing semiconductor microelectronic fabrication products within the at least one semiconductor microelectronic fabrication facility; and
  a series of historic semiconductor microelectronic fabrication product defect densities for the series of existing semiconductor microelectronic fabrication products fabricated within the at least one semiconductor microelectronic fabrication facility;
means for determining for a new semiconductor microelectronic fabrication product to be fabricated within the at least one semiconductor microelectronic fabrication facility:
  a die size;
  an N value which equals a summation of mask complexity factors for a series of masks employed for fabricating the new semiconductor microelectronic fabrication as determined through correlation with the series of historic mask complexity factors; and
  a Do value which is a baseline semiconductor microelectronic fabrication product defect density determined through correlation with the series of historic semiconductor microelectronic fabrication product defect densities; and
means for calculating an estimated yield for the new semiconductor microelectronic fabrication product using the equation:

$$Est\ Yield = 1/(1+(Do*(resiX/25.4)*(resiY/25.4)))^N$$

where resiX and resiY are chip's reference size X dimension and Y dimension.

13. The system of claim 12 wherein the series of arbitrarily determined historic mask complexity factors span a range of from about 0 to about 1.

14. The system of claim 12 wherein the series of arbitrarily determined historic mask complexity factors is determined employing a mask fabrication parameter selected from the group consisting of mask layer minimum linewidth dimensions, mask layer areal coverage and mask layer design complexity.

* * * * *